United States Patent
Mandella

(10) Patent No.: US 7,038,846 B2
(45) Date of Patent: May 2, 2006

(54) SOLID CATADIOPTRIC LENS WITH A SINGLE VIEWPOINT

(75) Inventor: Michael J. Mandella, Palo Alto, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 207 days.

(21) Appl. No.: 10/721,194

(22) Filed: Nov. 24, 2003

(65) Prior Publication Data

US 2005/0111084 A1 May 26, 2005

(51) Int. Cl.
*G02B 23/00* (2006.01)

(52) U.S. Cl. .................. 359/365; 359/725; 359/726; 359/708

(58) Field of Classification Search ........ 359/364–366, 359/362, 642, 709–712, 725–729, 708
See application file for complete search history.

(56) References Cited

U.S. PATENT DOCUMENTS

| | | | |
|---|---|---|---|
| 2,638,033 A * | 5/1953 | Buchele et al. ............. | 359/725 |
| 3,361,512 A | 1/1968 | Fuller | |
| 3,505,465 A | 4/1970 | Rees | |
| 4,566,763 A | 1/1986 | Greguss | |
| 4,655,555 A | 4/1987 | Machler et al. ............. | 350/432 |
| 5,089,910 A | 2/1992 | Sigler | |
| 5,191,469 A | 3/1993 | Margolis | |
| 5,386,316 A | 1/1995 | Cook | |
| 5,400,169 A | 3/1995 | Eden | |
| 5,471,346 A | 11/1995 | Ames | |
| 5,473,474 A | 12/1995 | Powell | |
| 5,502,309 A | 3/1996 | Davis | |
| 5,627,675 A | 5/1997 | Davis et al. | |
| 5,631,770 A | 5/1997 | Jarmuz | |
| 5,638,219 A | 6/1997 | Medina Puerta et al. | |
| 5,710,661 A | 1/1998 | Cook | |
| 5,760,826 A | 6/1998 | Nayar | |
| 5,841,574 A | 11/1998 | Willey | |
| 5,841,589 A | 11/1998 | Davis et al. | |
| 5,854,713 A | 12/1998 | Kuroda et al. | |
| 5,920,337 A | 7/1999 | Glassman et al. | |
| 5,940,222 A | 8/1999 | Sinclair et al. | |
| 6,118,474 A | 9/2000 | Nayar | |
| 6,118,583 A | 9/2000 | Rogers | |
| 6,130,783 A | 10/2000 | Yagi et al. | |
| 6,226,035 B1 | 5/2001 | Korein et al. | |
| 6,262,760 B1 | 7/2001 | Glassman et al. | |
| 6,304,285 B1 | 10/2001 | Geng | |

(Continued)

*Primary Examiner*—Drew A. Dunn
*Assistant Examiner*—Joshua L. Pritchett
(74) *Attorney, Agent, or Firm*—Lumen Intellectual Property Services, Inc.

(57) ABSTRACT

A solid catadioptric lens with a single viewpoint has a spherical refractive surface with a center C on an optical axis of the lens. An ellipsoidal reflective surface of the lens faces the spherical refractive surface such that a first focus $F_1$ of the ellipsoidal reflective surface is coincident with the center C of the spherical refractive surface. Furthermore, the lens has a shaping surface facing the ellipsoidal reflective surface for shaping a light that passes the single viewpoint. The shaping surface can be refractive, reflective or semi-transparent and its shape can be ellipsoidal with its first focus $F_1'$ coincident with the second focus $F_2$ of the ellipsoidal reflective surface. The single viewpoint of the lens is at the center C of the spherical reflective surface and is enforced with an aperture that can be positioned at various points inside, on a surface or even outside the lens, depending on the type of shaping surface chosen.

22 Claims, 10 Drawing Sheets

U.S. PATENT DOCUMENTS

| | | |
|---|---|---|
| 6,333,826 B1 | 12/2001 | Charles |
| 6,356,296 B1 | 3/2002 | Driscoll, Jr. et al. |
| 6,412,961 B1 | 7/2002 | Hicks |
| 6,449,103 B1 | 9/2002 | Charles |
| 6,456,749 B1 | 9/2002 | Kasabach et al. |
| 6,542,184 B1 | 4/2003 | Driscoll, Jr. et al. |
| 6,583,815 B1 | 6/2003 | Driscoll, Jr. et al. |
| 6,611,282 B1 | 8/2003 | Trubko et al. |
| 6,789,908 B1 * | 9/2004 | Garcia .................. 359/859 |
| 2003/0142203 A1 | 7/2003 | Kawakami et al. |

* cited by examiner

SOLID CATADIOPTRIC LENS WITH A SINGLE VIEWPOINT

FIELD OF THE INVENTION

The present invention relates generally to lenses for applications such as vision and imaging where a single viewpoint is required, and in particular to catadioptric lenses having a single viewpoint.

BACKGROUND OF THE INVENTION

Applications in computational vision such as ego-motion estimation and tracking often require imaging a large field of view. It is also desirable for an imaging system to have a single viewpoint in order to produce geometrically correct perspective images from the panoramic images obtained from the imaging system. The single and fixed viewpoint constraint requires that an imaging system only capture light that is passing through a single point in three dimensional space, thus sampling the 5-dimensional plenoptic function at that point, which is known as the effective viewpoint. Such imaging systems have been realized by assemblies of curved mirrors and lenses. Although these catadioptric systems can have a large field of view and can satisfy the single viewpoint requirement they are cumbersome, expensive and large.

A number of wide field of view optics use facing mirrors to produce high quality images at the expense of an obscuration of the field of view. A simple example of a prior art optical system 10 of such type is shown in FIG. 1. System 10 has two facing mirrors 12, 14 aligned on an optical axis 16. Mirror 14 receives and reflects light from a scene 20 to mirror 12. Mirror 12 reflects the light back to mirror 14 such that the light passes a central aperture 18 in mirror 14 and projects an image 22 of scene 20 on a screen 24.

Mirror 12 obscures a cone-shaped central portion 26 of the field of view seen by mirror 14. The result of this obscuration is a shadow 28 in image 22. To be imaged, light arriving from scene 20 has to be incident on mirror 14 at an angle larger than the angle of cone 26, e.g., at an angle of incidence $\theta_i$ relative to axis 16.

The prior art contains teachings about telescopes and other systems that employ the above-described principles. For example, U.S. Pat. No. 5,089,910 to Sigler teaches a catadioptric zoom relay telescope with two mirrors of which the first mirror or primary mirror is aspheric. U.S. Pat. No. 5,940,222 to Sinclair et al. teaches catadioptric zoom lens assemblies employing these same principles.

Some applications such as robot vision and panoramic imaging require the optical system to have a single point of view or viewpoint. This condition enables the optical system to produce a perspective view of objects in its field of view. In some applications, it is further desirable to maximize the size of the field of view imaged from the single viewpoint.

It is difficult to satisfy all of the above conditions with a single system. The catadioptric zoom relay telescopes and lens assemblies are usually limited to a small field of view and many do not have a single viewpoint. In fact, many high quality systems offer excellent on-axis performance, e.g., as taught by Hicks in U.S. Pat. No. 6,412,961 but are inherently not single viewpoint. U.S. Pat. No. 5,473,474 to Powell teaches a panoramic lens that images a large field of view but lacks a single viewpoint. Still another approach using the facing mirrors configuration is taught by Kuroda et al. in U.S. Pat. No. 5,854,713. This patent describes a reflection type angle of view transforming optical apparatus that is hollow but also lacks a single viewpoint. Of further interest is the catadioptric system of Charles shown in U.S. Pat. No. 6,449,103. Additional references of interest include U.S. Pat. No. 4,566,763 teaching the use of a parabolic reflector and U.S. Application No. 2003/0142203 teaching the use of a hyperbolic reflector.

The prior art does teach some systems that have a single viewpoint. For example, U.S. Pat. No. 3,505,465 to Rees discloses how to use a hyperbolic mirror to produce a single viewpoint system for a person viewing an image such as a TV or video image produced, e.g., by a video camera. More recently, U.S. Pat. Nos. 5,760,826 and 6,118,474 to Nayar describe an imaging apparatus for imaging a scene with a substantially paraboloid-shaped reflector whose focus is coincident with the single viewpoint. The imaging apparatus has a telecentric means optically coupled to the paraboloid-shaped reflector for filtering out principal rays of electromagnetic radiation that are not orthographically reflected by the paraboloid-shaped reflector.

Unfortunately, none of the prior art teachings provide a compact, effective and easy to manufacture single viewpoint lens that can be used in vision systems requiring a panoramic projection or perspective view of objects distributed over a large field of view.

OJECTS AND ADVANTAGES

In view of the above, it is an object of the invention to provide a compact, effective, rugged and easy to manufacture catadioptric lens with a single viewpoint and a large field of view. In particular, it is an object of the invention to provide a single viewpoint catadioptric lens that can be used in vision systems such as vision systems requiring a panoramic projection.

These and other objects and advantages of the invention will become apparent upon reading the ensuing description.

SUMMARY OF THE INVENTION

The objects and advantages of the invention are secured by a solid catadioptric lens with a single point of view or viewpoint. The lens has an optical axis and a spherical refractive surface with a center C on the optical axis. The lens has an ellipsoidal reflective surface facing the spherical refractive surface arranged such that a first focus $F_1$ of the ellipsoidal reflective surface is coincident with the center C of the spherical refractive surface. The single viewpoint of the lens is at the center C of the spherical reflective surface. Further, the lens has a shaping surface facing the ellipsoidal reflective surface for shaping a light that passes the single viewpoint.

In one set of embodiments the shaping surface is a refractive shaping surface and the lens has an aperture for enforcing the single viewpoint at center C. The aperture is positioned at a second focus $F_2$ of the ellipsoidal reflective surface. The lens is constructed such that the second focus $F_2$ of the ellipsoidal reflective surface is on the optical axis, like first focus $F_1$.

In some embodiments where the shaping surface is a refractive shaping surface, the second focus $F_2$ is located near or even on the refractive shaping surface. In some other embodiments using a refractive shaping surface, the second focus $F_2$ is inside the lens. The refractive shaping surface can assume a variety of shapes, but it is preferably ellipsoidal, thus forming an ellipsoidal refractive shaping surface. For light shaping reasons, it is also preferred that the ellipsoidal refractive shaping surface have its first focus $F_{1'}$ coincident with the second focus $F_2$ of the ellipsoidal reflective surface. In some embodiments, it is also convenient that the ellipsoidal refractive shaping surface have a conic constant $K_2$ equal to a conic constant $K_1$ of the ellipsoidal reflective surface.

In another set of embodiments the shaping surface is a reflective surface and an aperture is used for enforcing the single viewpoint. For example, in some embodiments in this set the aperture is positioned on the ellipsoidal reflective surface. In alternative embodiments, the aperture is positioned beyond the ellipsoidal reflective surface. Again, for light shaping reasons the reflective surface is preferably a second ellipsoidal reflective shaping surface. Furthermore, in some specific embodiments the second ellipsoidal reflective shaping surface has a first focus $F_1$, coincident with the second focus $F_2$ of the ellipsoidal reflective surface. In some of these specific embodiments the second ellipsoidal reflective shaping surface has a conic constant $K_2$ equal to the conic constant $K_1$ of the ellipsoidal reflective surface.

It should be noted that whether the shaping surface is refractive or reflective it can assume various shapes including conic sections. Alternatively, the shaping surface can be flat. Furthermore, the shaping surface does not have to be only refractive or reflective; it can be semi-transparent.

The solid catadioptric lens is preferably made of a optical material with an index n. Suitable materials include glasses, plastics and other well-known optical materials.

The invention further provides for a single viewpoint vision system. The vision system employs the solid catadioptric lens for shaping light passing through the single viewpoint. It should be noted that the vision system can be used for projecting light or for collecting light for functions such as scanning or imaging, respectively. In embodiments where the lens is used for imaging, an imaging element can be provided for imaging the light onto an imaging unit or screen in an imaging plane. In scanning applications a scanning arrangement is provided.

In some embodiments an optical relay is used for passing the light from the lens to the application. For example, an optical relay can be used to pass the light to an imaging plane when the lens is deployed in an imaging vision system. In scanning vision systems, an optical relay can be used to deliver light from a scan element, e.g., a scan mirror to the lens.

The details of the invention will now be explained in the detailed description with reference to the attached drawing figures.

DETAILED DESCRIPTION

Figure 1:
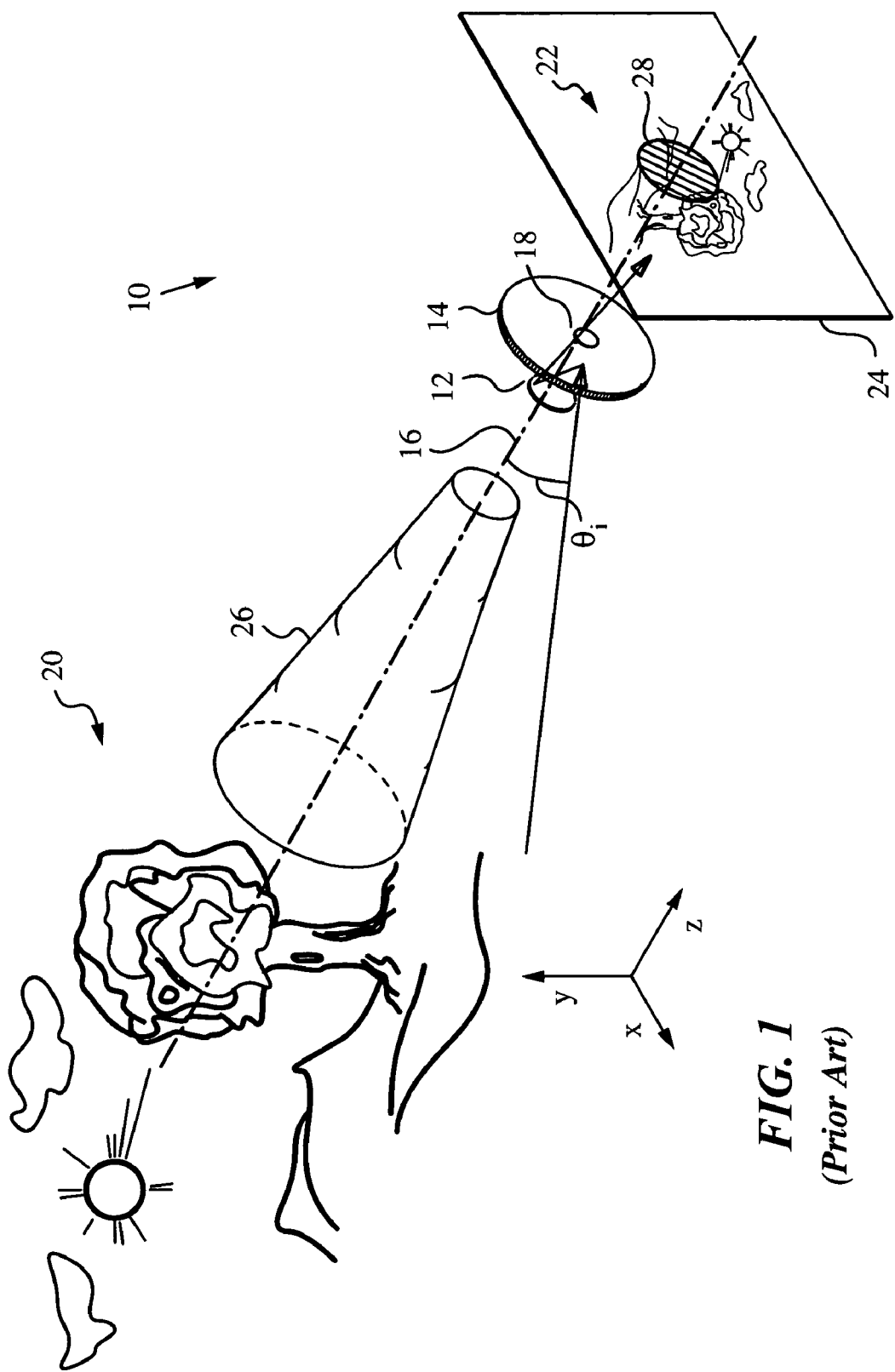
FIG. 1 (Prior art) is a three-dimensional diagram illustrating a class of off-axis optical systems.
Figure 2:
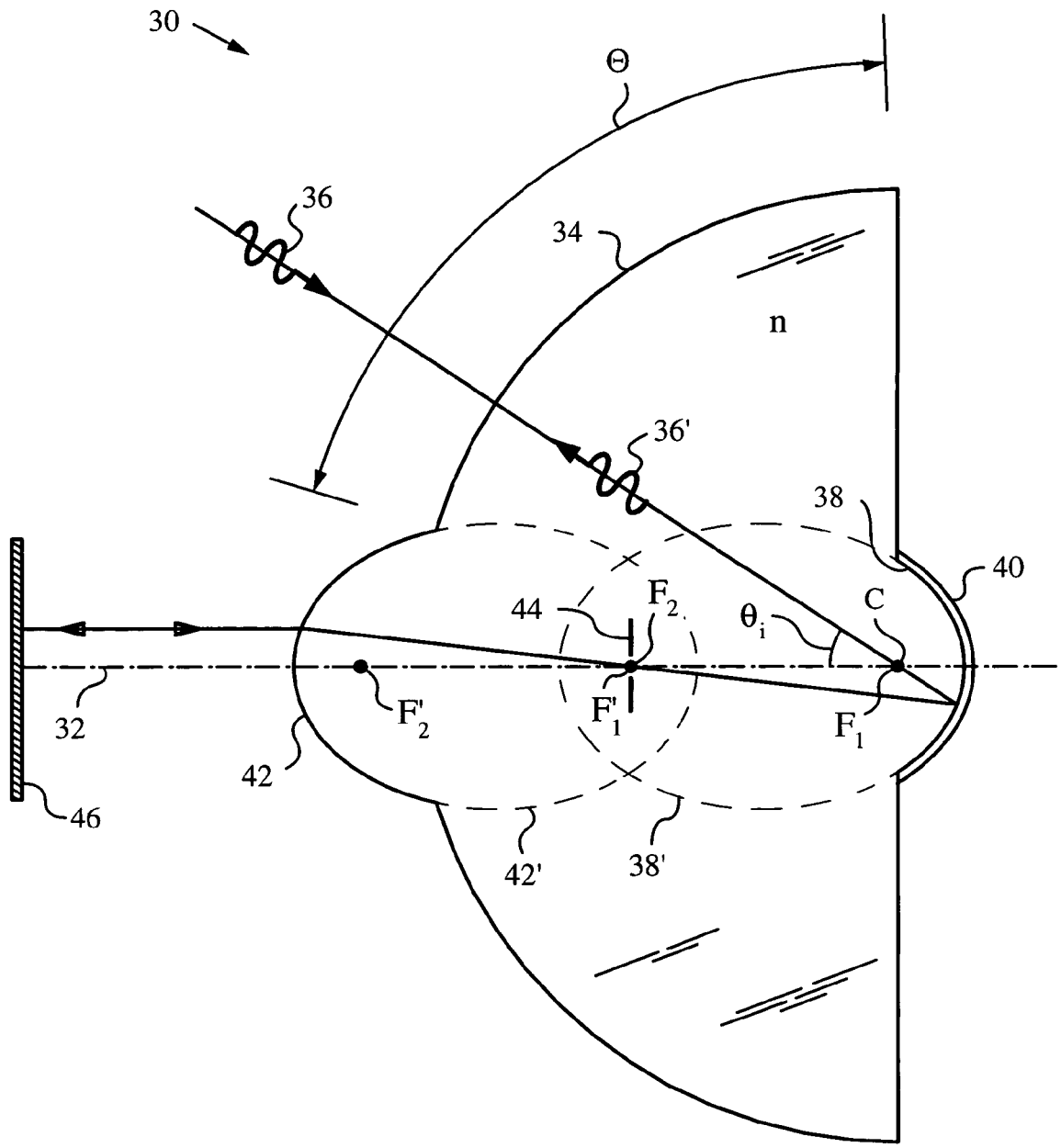
FIG. 2 is a cross-sectional side view of one embodiment of a lens according to the invention.

The present invention will be best understood by first referring to an embodiment of a single viewpoint solid catadioptric lens 30 as shown in FIG. 2 in cross-sectional side view. Lens 30 has an optical axis 32 and is made of an optical material of index n. Preferably, the optical material is uniform and exhibits substantially no or very little variation of index n. Suitable materials include glasses and plastics, such as moldable plastics and other optical materials.

Lens 30 has a spherical refractive surface 34 with a center C on optical axis 32. A light 36 propagating to and a light 36' propagating from center C traverses spherical refractive surface 34 at normal incidence. Spherical refractive surface 34 defines a solid angle $\Theta$ over which lens 30 gathers light 36 and into which lens 30 projects light 36'.

Lens 30 has an ellipsoidal reflective surface 38 facing spherical refractive surface 34. Ellipsoidal reflective surface 38 can be made reflective by providing it with a reflective coating or film 40, as shown in this embodiment, or by other means. Ellipsoidal reflective surface 38 is created by revolving a mathematical ellipse, as shown in dashed lines 38'. Specifically, surface 38 is defined by revolving ellipse 38' about optical axis 32. Surface 38 is oriented such that a first focus $F_1$ is coincident with center C of spherical refractive surface 34 on optical axis 32. Second focus $F_2$ defined by surface 38 is also on optical axis 32 and within lens 30.

Lens 30 has a shaping surface 42 facing ellipsoidal reflective surface 38 for shaping light 36, 36' passing through center C. In fact, center C is the point of view or viewpoint of lens 30. An aperture 44 is provided to ensure that center C is the only viewpoint of lens 30. In other words, aperture 44 enforces the single viewpoint of lens 30. Preferably, aperture 44 is formed by an object embedded in the optical material of lens 30 and having a pin-hole or diaphragm at second focus $F_2$. Alternatively, aperture 44 is defined in a non-transparent section of the optical material of lens 30. A person skilled in the art will appreciate that there are many alternative ways of defining aperture 44.

Shaping surface 42 can assume any shape and be located at any position past or even at aperture 44, as found suitable for shaping light 36, 36' for a given application. In the present embodiment shaping surface 42 is a refractive shaping surface for passing light 36, 36' in and out of lens 30. In fact, refractive shaping surface 42 is an ellipsoidal refractive shaping surface formed by revolving a mathematical ellipse 42', as shown in dashed lines, about optical axis 32. For light shaping reasons, it is preferred that ellipsoidal refractive shaping surface 42 have its first focus F1' coincident with second focus $F_2$ defined by surface 38, and its second focus $F_2'$ on optical axis 32 within lens 30. Even more preferably, surface 42 has a conic constant $K_2$ equal to:

$$K_2 = -\frac{1}{n^2},$$

where n is the index of the optical material. Under these circumstances, light 36 entering lens 30 over solid angle Θ emerges from lens 30 through surface 42 in a direction substantially parallel to optical axis 32. It is further possible to set a conic constant $K_1$ of surface 38 equal to conic constant $K_2$, as in the present embodiment.

A plate 46 is placed before lens 30. When lens 30 collects light 36 arriving at an angle of incidence $\theta_i$ to optical axis 32, then plate 46 can be a screen for projecting light 36 thereon. In this mode lens 30 can be used for imaging. Alternatively, plate 46 emits light 36' substantially parallel to optical axis 32 into lens 30. In this mode lens 30 projects light 36' into solid angle Θ and can be used for projecting an image.

Figure 3:
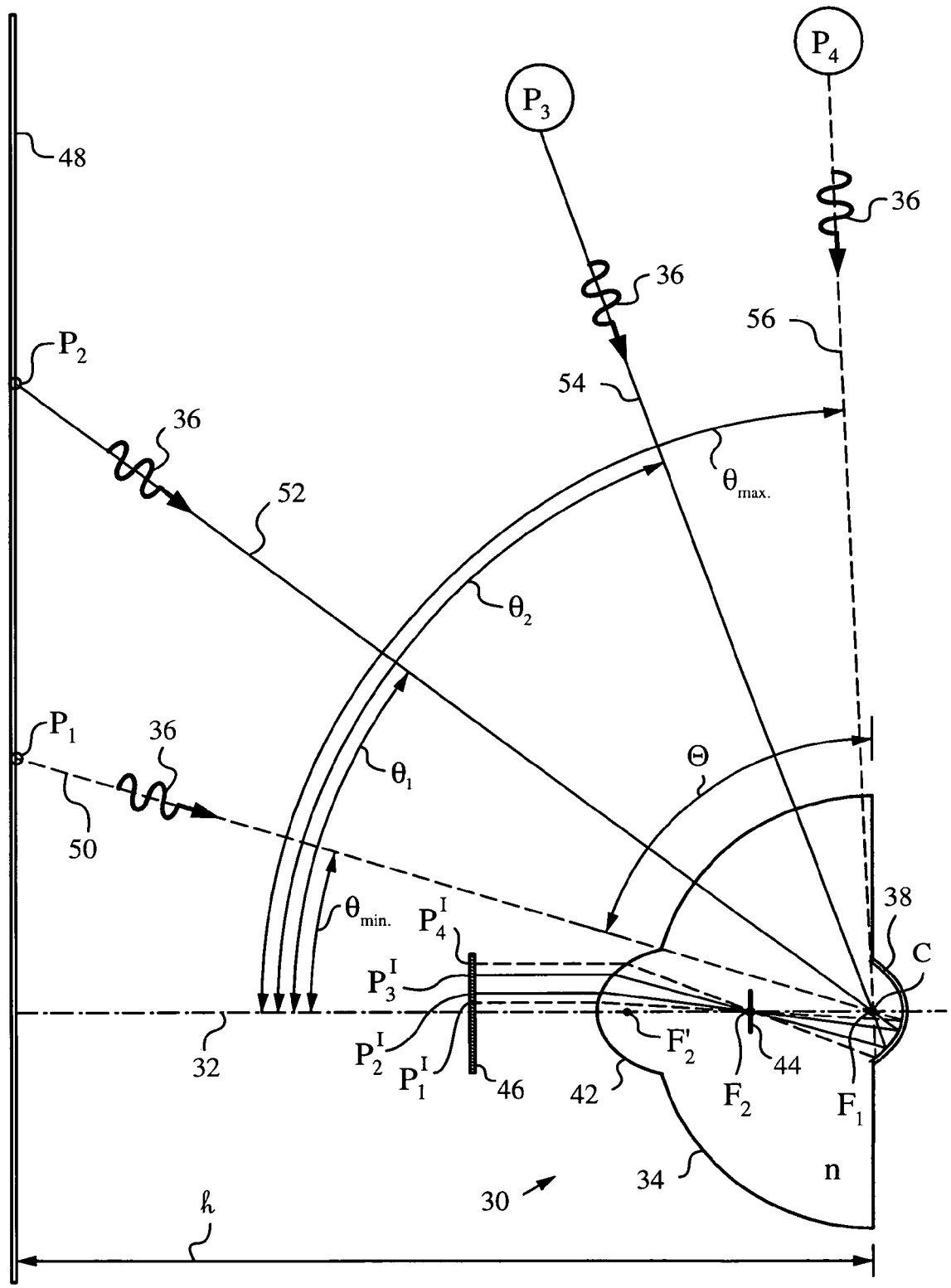
FIG. 3 is a cross-sectional side view of the lens of FIG. 2 used in imaging.

The operation of lens 30 for imaging a wide field of view is explained with reference to the cross-sectional side view of FIG. 3. The field of view is defined by solid angle Θ over which lens 30 gathers light 36. Note that angle Θ is symmetric about optical axis 32.

Lens 30 is positioned such that its single viewpoint at center C is at a height h above an object plane 48. A number of object points $P_1$, $P_2$, $P_3$, $P_4$ are located on object plane 48 (points $P_3$ and $P_4$ are far away from optical axis 32 on plane 48). Light 36 emanates from object plane 48 and propagates in ray bundles 50, 52, 54 and 56 to lens 30. Point $P_1$ lies at one edge of the field of view such that ray bundle 50 emanating from it enters lens 30 at minimum incidence angle $\theta_{min}$. Point $P_4$ lies at the other edge of the field of view such that ray bundle 56 emanating from it enters lens 30 at maximum incidence angle $\theta_{max}$. The design of lens 30 enables maximum incidence angle $\theta_{max}$ to be nearly 90°. Ray bundles 50 and 56 are drawn in dashed lines to indicate that they bound the field of view of lens 30.

Ray bundles 50, . . . 56 enter lens 30 via spherical refractive surface 34. They then pass through the single point of view at center C and propagate to reflective ellipsoidal surface 38. At surface 38 ray bundles 50, . . . 56 are reflected to ellipsoidal refractive shaping surface 42. Aperture 44 enforces the single point of view by allowing ray bundles 50, . . . 56 to continue propagating to ellipsoidal refractive shaping surface 42 while stopping light that enters via spherical refractive surface 34 but does not pass through the single point of view at center C.

Since conic constants $K_1$ and $K_2$ of surfaces 38 and 42 are equal, and $K_1=K_2=-1/n^2$, and foci $F_2$ and $F_1'$ coincide, light 36 of ray bundles 50, . . . 56 is substantially parallel to optical axis 32 upon exiting lens 30. This is a desirable type of shaping because ray bundles 50, . . . 56 are projected onto image plane 46 without requiring further optical shaping. Points $P_1$, . . . $P_4$ on object plane 48 are thereby imaged to corresponding imaged points $P_1^I$, . . . $P_4^I$ on image plane 46.

An advantageous feature of lens 30 is that ray bundles 50, . . . 56 impinging on refractive surface 34 at equal angular intervals or field angles are mapped substantially linearly to distances from optical axis 32 when exiting ellipsoidal refractive shaping surface 42. This means that object points $P_1$, . . . $P_4$ at equal field angles are mapped to imaged points $P_1^I$, . . . $P_4^I$ at substantially equal separations from each other in image plane 46. The substantially linear map between field angle and distance from optical axis in image plane 46 is useful in many imaging applications and is sometimes referred to as f-θ imaging.

Figure 4:
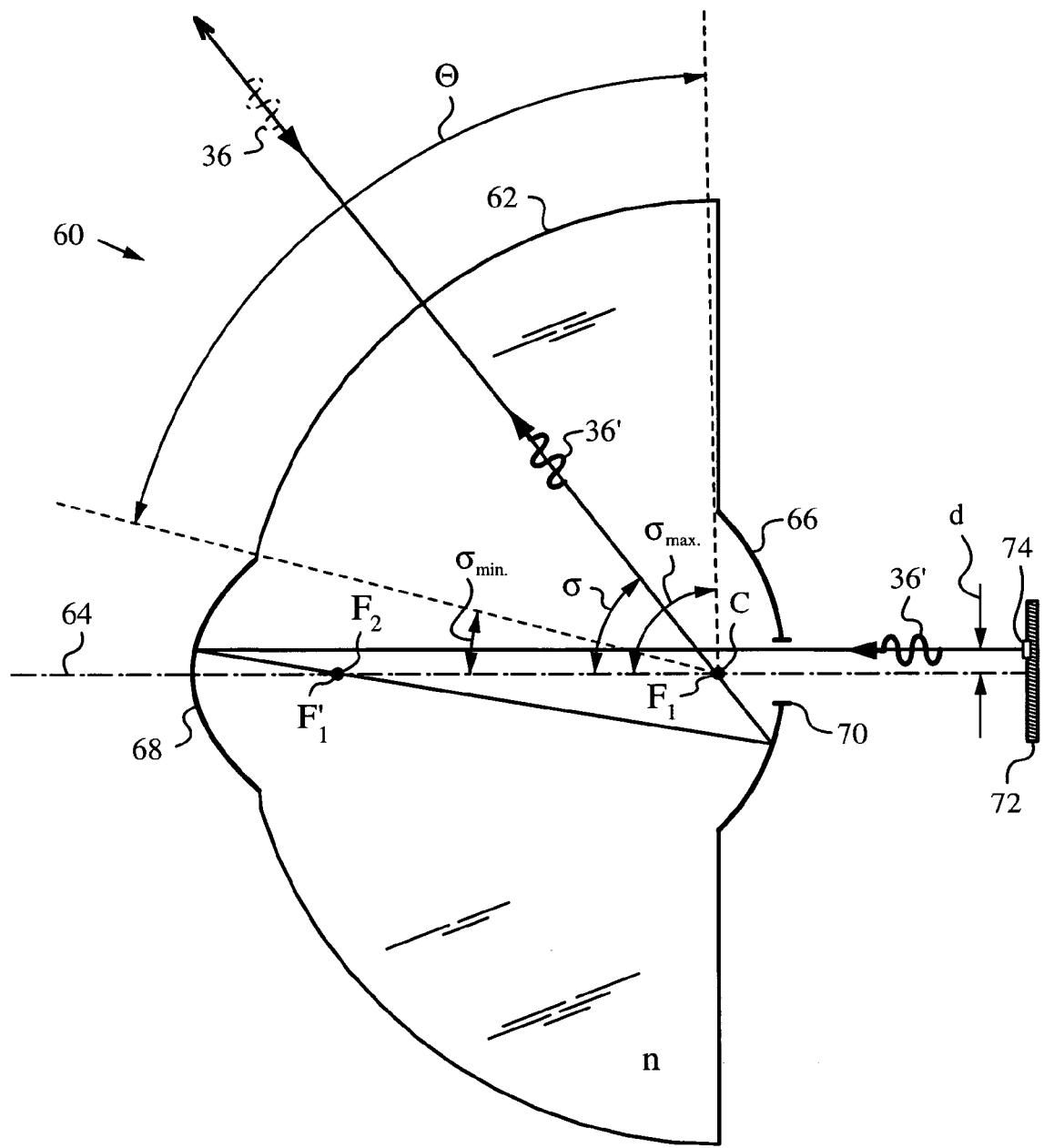
FIG. 4 is a cross-sectional side view illustrating another embodiment of a lens according to the invention.

FIG. 4 is a cross-sectional side view of another embodiment of a single viewpoint catadioptric lens 60. Lens 60 is made of a moldable plastic of index n and has a spherical refractive surface 62 with a center C on an optical axis 64. Surface 62 faces an ellipsoidal reflective surface 66. The two surfaces are arranged such that a first focus $F_1$ defined by surface 66 coincides with center C. A shaping surface 68 faces surface 66. In this embodiment shaping surface 68 is reflective and is parabolic-shaped, thus forming a paraboloid reflective shaping surface. Surface 68 is defined by a single focus $F_1'$ lying on optical axis 64. Moreover, focus $F_1'$ coincides with a second focus $F_2$ of surface 66. In this embodiment conic constants $K_1$ and $K_2$ of surfaces 66 and 68 are not equal.

Lens 60 has an aperture 70 for enforcing the single viewpoint at center C. Since light cannot pass through paraboloid reflective shaping surface 68, aperture is positioned at facing surface 66. In the present embodiment aperture 70 is defined in or on ellipsoidal reflective surface 66. For example, aperture 70 is a pin-hole in a reflective coating or film covering surface 66. Alternatively, aperture 70 can be placed beyond surface 66 or before it.

A projecting unit 72 for emitting light 36' is positioned behind surface 66 and centered on optical axis 64. Unit 72 can be an array of light emitters and is used herein to illustrate the application of lens 60 for projecting light 36' into the field of view indicated by angle Θ. The field of view defines a minimum emission angle $\sigma_{min}$ and a maximum emission angle $\sigma_{max}$. Unit 72 emits light 36' from its emitters such as a pixel 74 far enough from optical axis 64 to map to an emission angle σ such that $\sigma_{min}<\sigma<\sigma_{max}$. For example, light 36' emitted from a pixel 74 at a distance d to optical axis 64, is admitted into lens 60 through aperture 70 and emitted at emission angle σ. A person skilled in the art will recognize that additional optical elements such as lenses and mirrors can be placed between surface 66 and unit 72 for performing various light shaping and guiding functions as may be required for any particular application.

In one application, lens 60 is used for projecting light 36' into its field of view. Unit 72 activates pixel 74 for emitting light 36' at emission angle σ to optical axis 64. Light 36' propagates parallel and offset by distance d to optical axis 64 and is admitted into lens 60 via aperture 70. The light guiding properties of lens 60 map light 36' to angle σ as it exits lens 60 through spherical refractive surface 62.

In another application lens 60 is used for collecting light 36 arriving from the field of view, e.g., at an angle of incidence $\theta_i=\sigma$, where angle of incidence $\theta_i$ is larger than a minimum incidence angle $\theta_{min}=\sigma_{min}$ and smaller than a maximum incidence angle $\theta_{min}=\sigma_{max}$.

Figure 5:
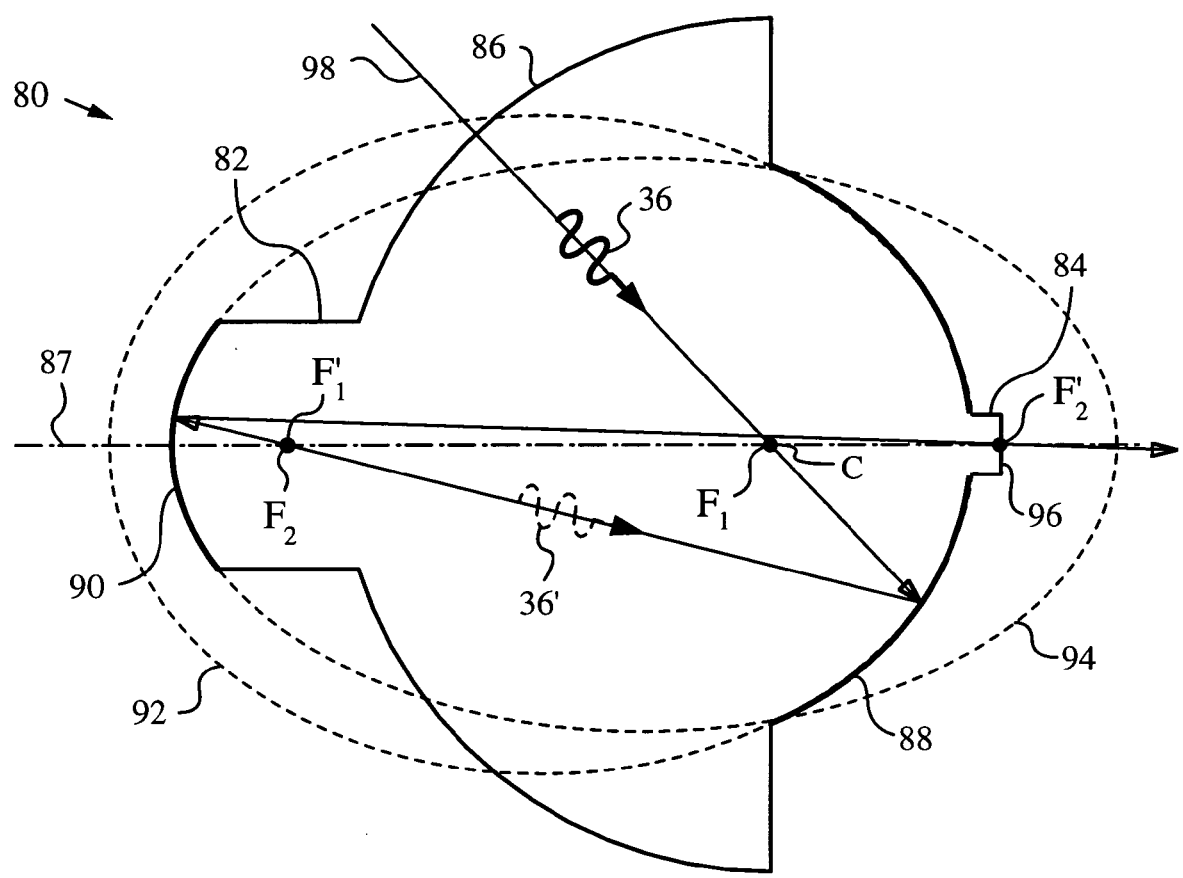
FIG. 5 is a cross-sectional side view of a lens according to the invention with folded geometry.

The geometry of the single viewpoint catadioptric lens of the invention can be modified in many ways. For example, the ellipsoidal surfaces of the lens can be folded. FIG. 5 illustrates an embodiment of a folded single viewpoint catadioptric lens 80 having external profiles 82 and 84. Lens 80 has a spherical refractive surface 86 with a center C coincident with the single viewpoint. An ellipsoidal reflective surface 88 having a first focus $F_1$ and a second focus $F_2$ faces surface 86 and its first focus $F_1$ is coincident with center C. A shaping surface 90, here in the form of a second reflective ellipsoidal shaping surface having first and second foci $F_1'$, $F_2'$ faces surface 86. All foci are on an optical axis 87.

Ellipses 92, 94 that are revolved to form surfaces 88 and 90 are indicated in dashed lines for clarification. In contrast to previous embodiments, ellipse 94 has its second focus $F_2'$ on the other side of the viewpoint or center C and even beyond surface 88. The overlap of ellipses 92, 94 and surfaces 88, 90 created by their revolution produces a geometry that is herein referred to as folded.

Second reflective ellipsoidal shaping surface 90 is formed on external profile 82 with the aid of a reflective coating or film (not shown). The size of surface 90 can decreased to enlarge the field of view of lens 80. External profile 84 extends from surface 88 and terminates at a flat coupling face 96. Face 96 is transparent and located such that second focus $F_2'$ of surface 90 falls on it. In fact, the size of face 96 defines the aperture of lens 80 that enforces the single viewpoint at center C. If a small aperture is desired, then a mask can be supplied on face 96 and a central opening in the mask can define the aperture.

To understand the operation of lens 80 we follow an incident ray bundle 98 of light 36 entering lens 80, while realizing that lens 80 can also project light 36'. Light 36 enters lens 80 through surface 86, passes single viewpoint at center C and is reflected by surface 88. Light 36 then propagates to second focus $F_2$ as mathematics dictate that light passing through one focus of an ellipsoid and internally reflected converge at its second focus. By design, second focus $F_2$ is coincident with first focus $F_1'$ of surface 90 that is also ellipsoidal and thus enforces the same mathematical rule on light 36. Specifically, light 36 is reflected from surface 90 and converges at second focus $F_2'$ on coupling face 96.

Light 36 is out-coupled through face 96 and may be further shaped, deflected and/or steered as required by the deployment conditions of lens 80. For example, imaging elements can be positioned past face 96 to guide light 36 into an image plane. Alternatively, optical relays can be positioned there to shape and guide light 36.

Figure 6:
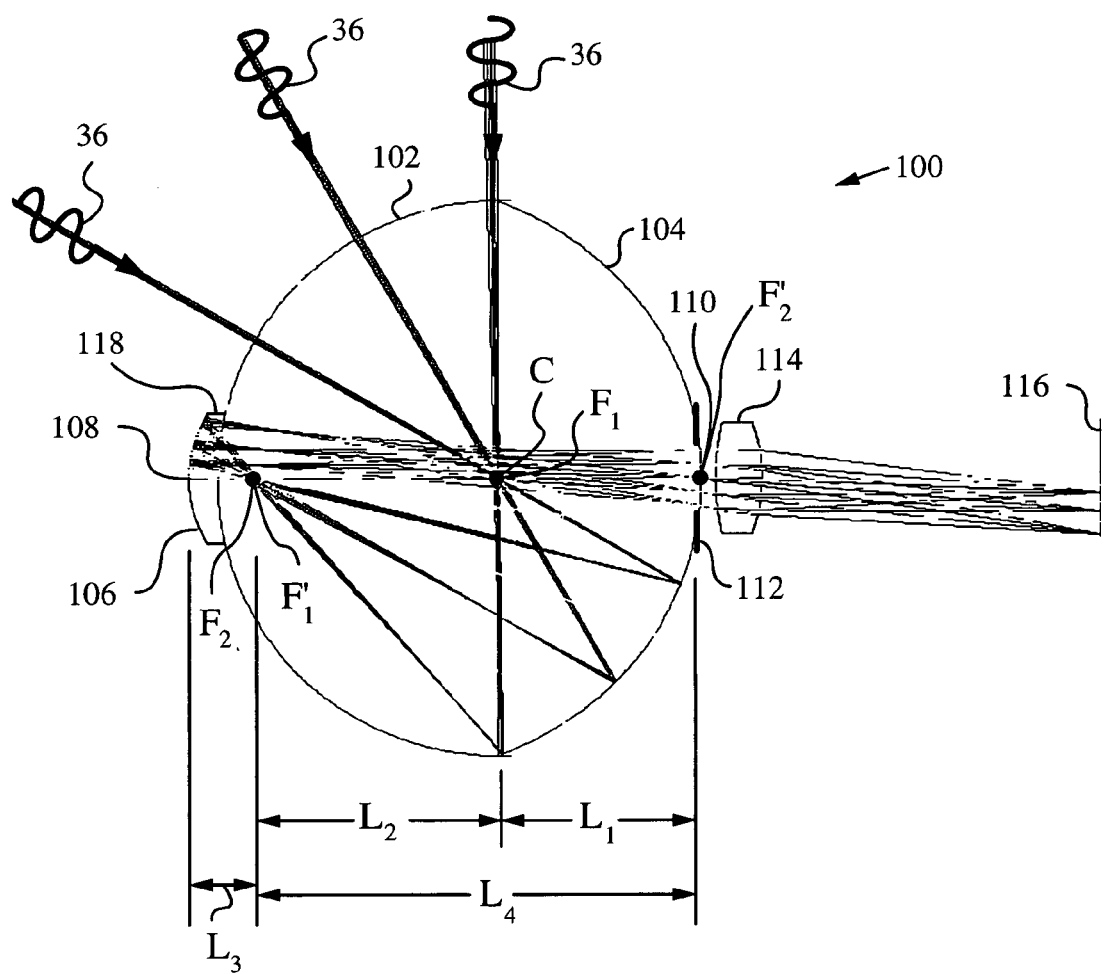
FIG. 6 is a cross-sectional side view of another lens with folded geometry.

Another folded geometry is embodied by a catadioptric lens 100 shown with its ray-trace in FIG. 6. The basic geometry of lens 100 is described by nine geometric design parameters: R, $R_1$, $K_1$, $R_2$, $K_2$, $L_1$, $L_2$, $L_3$, and $L_4$. The first five of these represent: radius of spherical refractive surface 102, radius of curvature of ellipsoidal reflective surface 104, conic constant of surface 104, radius of curvature of second ellipsoidal reflective shaping surface 106, conic constant of surface 106. Parameters $L_1$, $L_2$, $L_3$, and $L_4$ correspond to lengths as shown. Additionally, 108 is an apex of surface 106, 110 is an apex of surface 104, and 112 is an aperture enforcing the singe viewpoint of lens 100. Note that second focus $F_2'$ of surface 106 falls on surface 104 within aperture 112. Note that surface 106 is on an external profile 118 in this embodiment.

The design of lens 100 is a complete closed form solution. Thus, the optical performance of any vision system using lens 100 mostly depends on the design of its optical relay. In the present embodiment a single relay lens 114 represents an optical relay for producing images at a single wavelength of light 36 in an image plane 116. A more achromatic optical relay with a field flattener can be used for color imaging, as will be appreciated by a person skilled in the art.

Lens 100 can be scaled to different sizes by changing the values of R, $R_1$ and $R_2$. The general shape of lens 100 and its angular magnification is controlled-by the ratio of the parameters $K_1$ and $K_2$. Once these parameters have been adjusted, then the following equations are used to find $L_1$, $L_2$, $L_3$ and $L_4$:

$$L_1 = R_1 \frac{[1 - \sqrt{-K_1}]}{1 + K_1};$$

$$L_2 = \frac{2R_1\sqrt{-K_1}}{1 + K_1};$$

$$L_3 = \frac{R_2[1 - \sqrt{-K_2}]}{1 + K_2};$$

-continued $$L_4 = \frac{2R_2\sqrt{-K_2}}{1 + K_2}.$$

This ensures that the first geometrical focus $F_1'$ of second ellipsoidal reflective shaping surface 106 is coincident with second geometrical focus $F_2$ of ellipsoidal reflective surface 104. The present embodiment illustrates a special case where $L_4 = L_1 + L_2$, superposes second geometrical focus $F_2'$ of second ellipsoidal reflective shaping surface 106 on apex 110 of ellipsoidal reflective surface 104. As noted above, this causes aperture 112, which may have a diameter of 2 mm or even less, depending on the desired light intensity, to fall on apex 110. Preferably, aperture 112 is just a portion of ellipsoidal reflective surface 104 that is masked off before coating entire surface 104 with a reflective coating such as aluminum.

Figure 7:
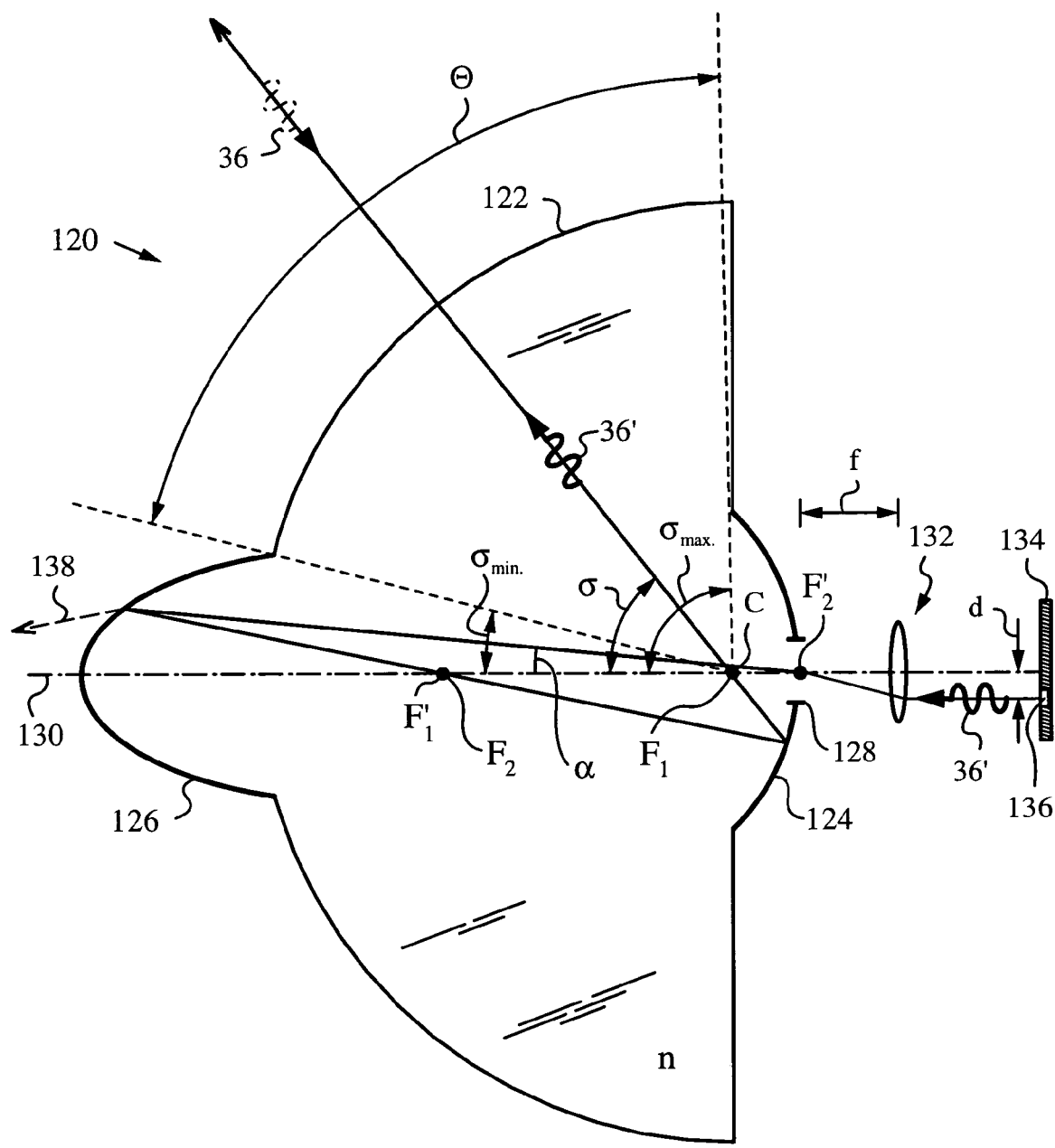
FIG. 7 is a cross-sectional side view of a folded lens used for projecting or imaging.

FIG. 7 illustrates still another folded single viewpoint lens 120 without any external profiles and a field of view described by solid angle Θ. Lens 120 has a spherical refractive surface 122 facing an ellipsoidal reflective surface 124 such that a center C of surface 122 is coincident with first focus $F_1$ of surface 124. Surface 124 faces a semi-transparent ellipsoidal shaping surface 126 such that a second focus $F_2$ of surface 124 is coincident with a first focus $F_1'$ of surface 126. Second focus $F_2'$ of surface 126 falls on surface 124 within an aperture 128. Center C and all foci are on an optical axis 130 of lens 120.

An optical relay 132 is positioned next to surface 124 for guiding light 36' generated by a display unit 134 to lens 120. More precisely, relay 132 is a telecentric relay for guiding light 36' that propagates parallel to optical axis 130 into lens 120. Relay 132 converts a distance d at which light 36' is offset from optical axis 130 to an admission angle α into lens 120. Reference f indicates a focal length of relay 132. By virtue of the design of relay 132, admission angle α is a substantially linear function of distance d over small values of angle α.

During operation, a pixel 136 of display unit 134 offset by distance d from optical axis 130 generates light 36'. Relay 132 guides light 36' into lens 120 at admission angle α. Light 36' is reflected from semi-transparent surface 126, surface 124 and then exits lens 120 at an emission angle σ through surface 122. During this process angle α is "amplified" to angle σ and the angular magnification is given by the ratio σ/α. A portion 138 of light 36' exits lens 120 via semi-transparent surface 126. Portion 138 can be used for monitoring the operation of lens 120 and/or display unit 134. Portion 138 can also be used for verify alignment of lens 120 and display unit 134 or other functions. A skilled artisan will appreciate that the degree of transparency of semi-transparent surface 126 can be adjusted depending on these functions. It should also be noted that the transparency of semi-transparent surface 126 can depend on wavelength of light 36'.

In an alternative embodiment, lens 120 operates in reverse by admitting light 36 and projecting it to pixel 136. In this case display unit 134 is replaced by a light-sensing element, e.g., an imaging element such as an imaging array. In such array pixel 136 is light-sensitive. Note that a portion of light 36 is also transmitted through semi-transparent surface 126.

From the small sample of designs described above, it is clear that catadioptric lenses according to the invention are versatile, simple, rugged and easy to manufacture. They can be made in parts or as a whole part by techniques such as molding. Their optical performance depends largely on the accuracy of the surfaces and the design of auxiliary optical relays that deliver light to or collect light from them. Such relays should be designed based on the vision system or application and specific design choices may depend on whether it is a system with an imaging element, a scanning arrangement or a display element.

Figure 8:
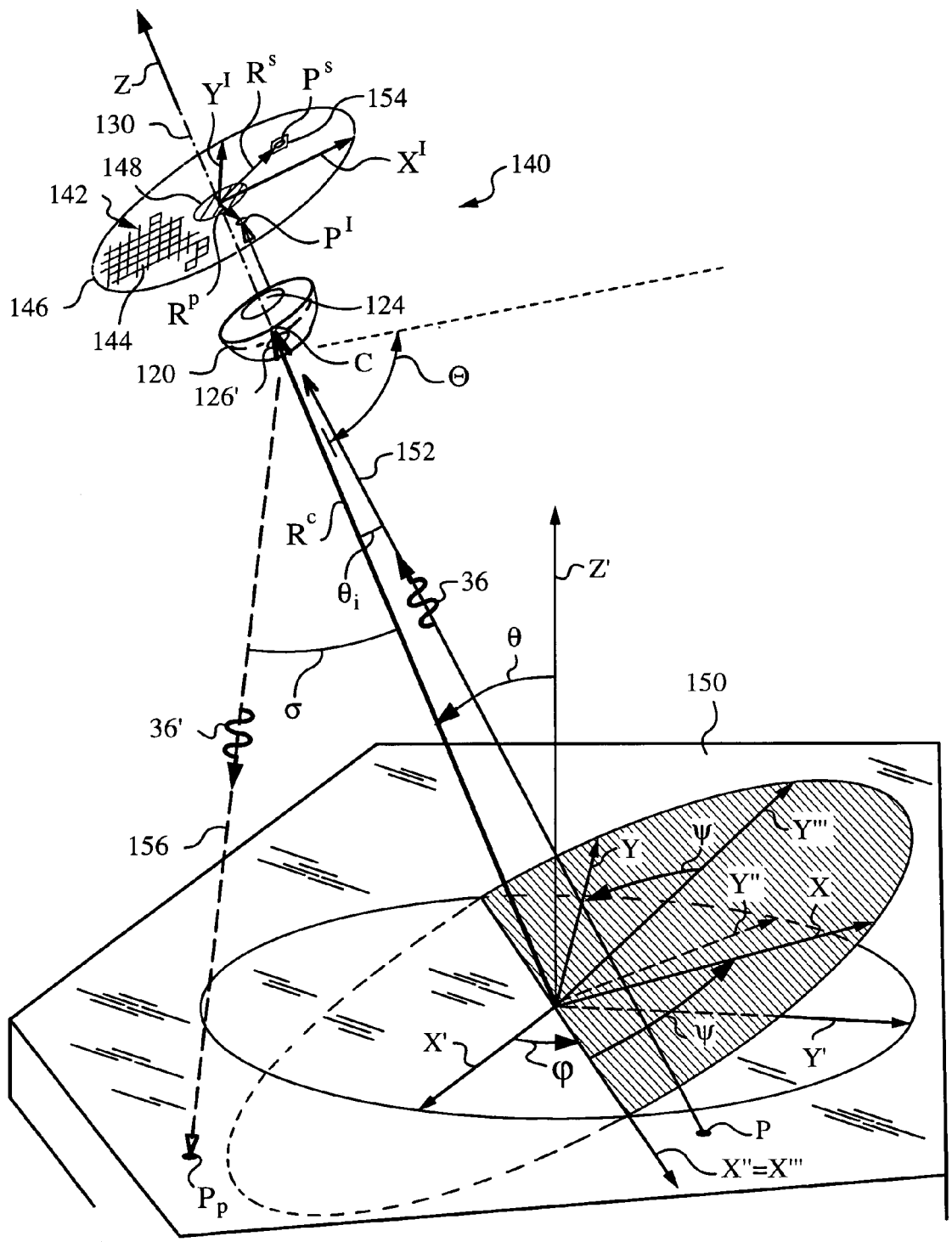
FIG. 8 is a three-dimensional diagram showing a vision system having an imaging element and employing the lens of FIG. 7.

FIG. 8 illustrates a single viewpoint vision system 140 using lens 120 with a reflective ellipsoidal shaping surface 126' rather than semi-transparent shaping surface 126. Vision system 140 has an imaging element 142, e.g., an imaging array with pixels 144 (shown partially for clarity). Array 142 is positioned in an image plane 146 behind surface 124. The optical relay between surface 124 and image plane 146 is not shown here for reasons of clarity. However, any type of relay, including a telecentric relay as described in FIG. 7, can be used between lens 120 and imaging array 142.

Surface 126' limits the field of view of lens 120 to the off-axis region described by solid angle Θ. Therefore, vision system 140 is most useful when the center of the field of view is obscured or does not require imaging. The center of the field of view corresponds to shadow 148 in image plane 146. For clarity of explanation, aperture 128 for enforcing point of view C is not indicated on surface 124 and image plane 146 is shown enlarged.

Vision system 140 is directed at an arbitrary object 150 to be imaged. Herein, object 150 is a substrate whose surface lies in an X'-Y' plane of object coordinates (X',Y',Z'). Vision system 140 is above substrate 150 and the origin of object coordinates and single viewpoint C of lens 120 are connected by a vector $R^c$. Vector $R^c$ is collinear with optical axis 130 and the norm of vector $R^c$ is the distance between the origin and viewpoint C. Vision system 140 moves in space and its coordinates (X,Y,Z) are rotated with respect to object coordinates (X',Y',Z'). Many conventions exist to align the object coordinates and vision system coordinates. For example, the rotation between vision system coordinates (X,Y,Z) and object coordinates can be expressed by three consecutive rotations by Euler angles ($\phi,\theta,\psi$).

During operation vision system 140 collects light 36, such as light 36 from a point P on substrate 150. Light 36 propagates in a ray bundle 152 to enter lens 120 at angle of incidence $\theta_i$. Lens 120 images point P to an imaged point $P^I$ on imaging array 142 in image plane 146. Conveniently, image plane 146 is described by imaging array axes $X^I$ and $Y^I$, and the location of imaged point $P^I$ in image plane 146 is described by a vector $R^P$. Because of its single viewpoint C, lens 120 produces a panoramic projection of imaged point $P^I$.

Thus, lens 120 can produce a panoramic image of object 150 in image plane 146.

In a modified embodiment, vision system 140 can use lens 120 to project light 36' to a projected point $P_P$ on substrate 150 and collect light 36 from point P simultaneously. In this embodiment a pixel 154 at point $P^S$ on array 142 produces light 36'. The location of point $P^S$ in image plane 146 is described by vector $R^S$. A ray bundle 156 of light 36' is projected through lens 120 at emission angle σ onto substrate 150 to point $P_P$. Hybrid arrays having light sensitive and light-emitting pixels that can be employed in this embodiment are known in the art. Of course, a display unit such as the one shown in FIG. 7 can be used for projecting light 36' if no imaging of substrate 150 is required.

Figure 9:
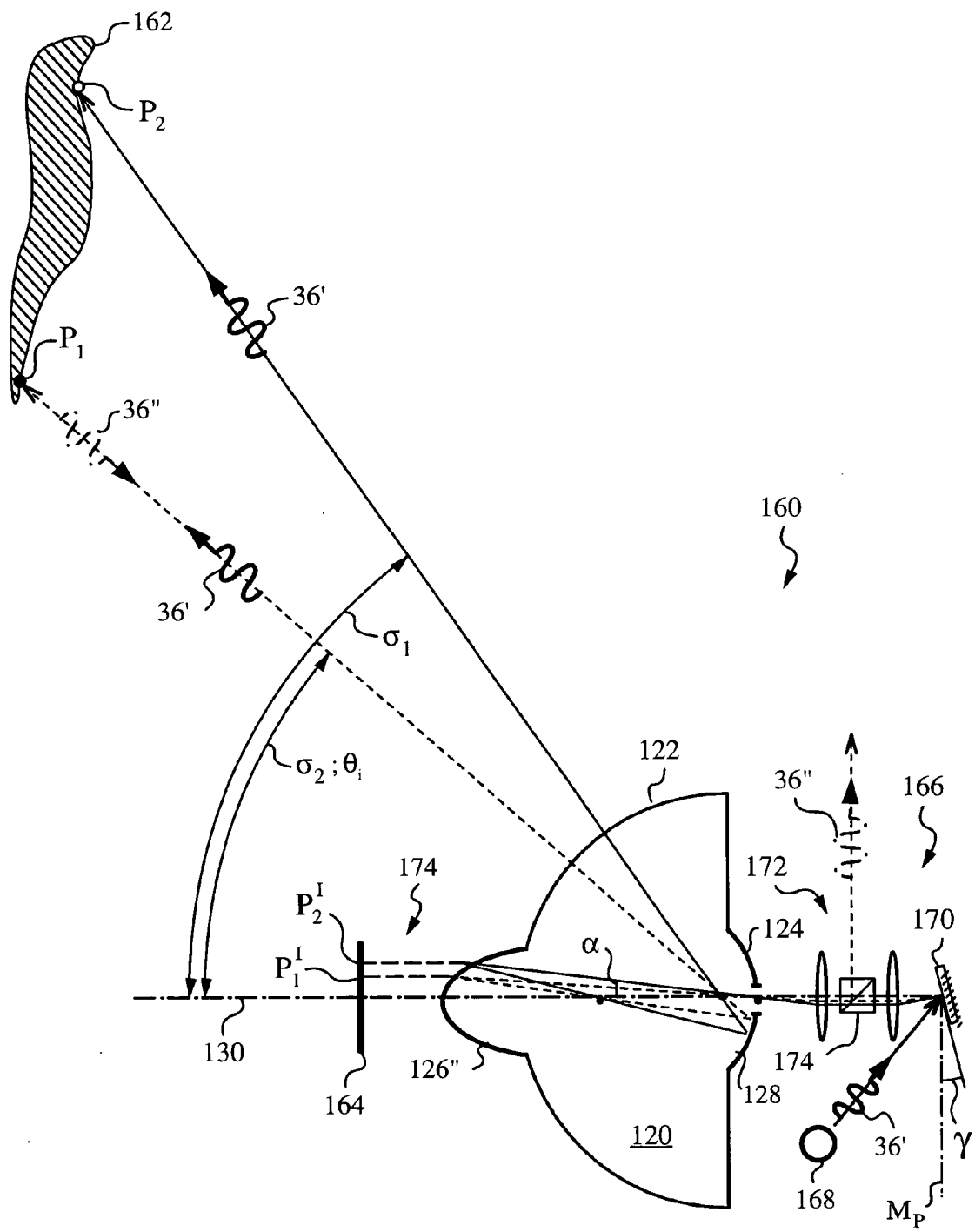
FIG. 9 is cross-sectional side view showing another vision system having a scanning arrangement and employing the lens of FIG. 7.

FIG. 9 shows a vision system 160 employing lens 120 with a wavelength-dependent semi-transparent ellipsoidal shaping surface 126" to project light 36' on an object 162. At certain points object 162 responds by producing a back-scattered light 36" and system 160 simultaneously uses lens 120 to collect back-scattered light 36".

System 160 has a display unit 164, e.g., a display screen or a detector array, in front of surface 126". Unit 164 is centered on optical axis 130. Further, system 160 has a scanning arrangement 166 with a light source 168 for generating light 36'. Arrangement 166 has a scan mirror 170 for deflecting or steering light 36'. Mirror 170 is tilted by a scan angle γ with respect to a mirror plane $M_P$. Drivers for controlling scan angle γ are well-known in the art.

Arrangement 166 has an optical relay 172 for shaping and directing light 36' along optical axis 130 into lens 120 through aperture 128. Relay 172 is of the type that converts scan angle γ to a corresponding admission angle α into lens 120. For example, relay 172 is a 4-f system using two lenses with the same or different focal lengths on axis 130 such that the center of mirror 170 is coincident with one focal point of relay 172 and second focus $F_2$' of surface 126" is coincident with another focal point of the 4-f system. Relay 172 also has a beam splitter 176 for deflecting any light returning to scanning arrangement 166 from lens 120.

In operation, system 160 directs light 36' by adjusting scan angle γ of mirror 170. A change in scan angle γ changes emission angle σ at which light 36' exits lens 120. In the present case scan angle γ is varied such that light 36' is first emitted at angle $\sigma_1$ and then at $\sigma_2$.

The pass wavelength of semi-transparent surface 126" is chosen such that a small portion 174 of light 36', e.g., a fraction of a percent, is transmitted and projected onto display unit 164. Specifically, when light 36' is emitted at angle $\sigma_1$ portion 174 is transmitted to point $P_2^I$. Then, at angle $\sigma_2$ portion 174 is transmitted to point $P_1^I$. Portion 174 of light 36' can be used for reference, feedback, tracking or other auxiliary functions.

At angle $\sigma_2$ object 162 produces back-scattered light 36" that returns to lens 120 along the path of light 36'. Light 36" enters lens 120 through surface 122 at an angle of incidence $\theta_i=\sigma_2$. A small fraction of light 36" exits lens 120 via surface 126". The remainder of light 36" is reflected by surface 126" and is separated by beam-splitter 174. Of course, if the fraction of light 36" registered by unit 164 is sufficient for monitoring back-scattered light 36" then the remainder of light 36" can be discarded. In those cases beam-splitter 174 can be removed.

Figure 10:
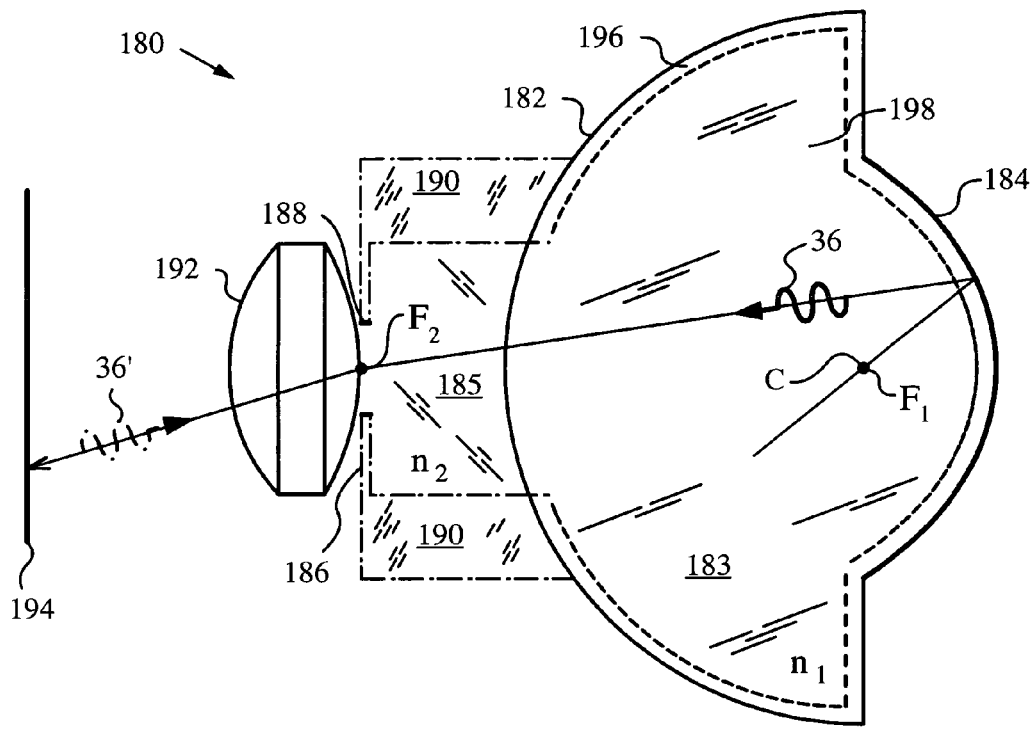
FIG. 10 is a cross-sectional side view of yet another lens according to the invention.

FIG. 10 illustrates yet another embodiment of a single viewpoint lens 180. Lens 180 has a spherical refractive surface 182 facing an ellipsoidal reflective surface 184, which in turn faces a flat refractive shaping surface 186. First focus $F_1$ of surface 184 and center C of surface 182 are coincident at the single viewpoint of lens 180. The second focus $F_2$ of surface 184 is on surface 186 and within aperture 188 enforcing the single viewpoint.

Lens 180 is made of two materials 183, 185 having indices $n_1$, $n_2$ respectively. Material 183 is preferably a glass or plastic, while material 185 is a glass or plastic, but could also be a liquid or optical gel filling a cavity in lens 180. In the latter case, a portion 190 of lens 180 indicated in dashed and dotted lines is made of a suitable material that can also be a glass or plastic forming an envelope to contain material 185. It is preferable that $n_1=n_2$.

An optical relay in the form of a compound lens 192 is positioned adjacent to surface 186 for out-coupling light 36 from lens 180. In the present case lens 192 is designed for projecting light 36 onto an image plane 194. In reverse, lens 192 can be used for in-coupling light 36' from image plane 194 into lens 180.

Alternatively, lens 180 can be built with the aid of a shell 196 indicated in dashed lines and defining an internal cavity 198. Cavity 198 is filled, e.g., with an optical gel or other optical material. In fact, entire lens 180 including portion 190 can be a hollow form or shell filled with an optical material such as an optical gel or liquid.

Figure 11:
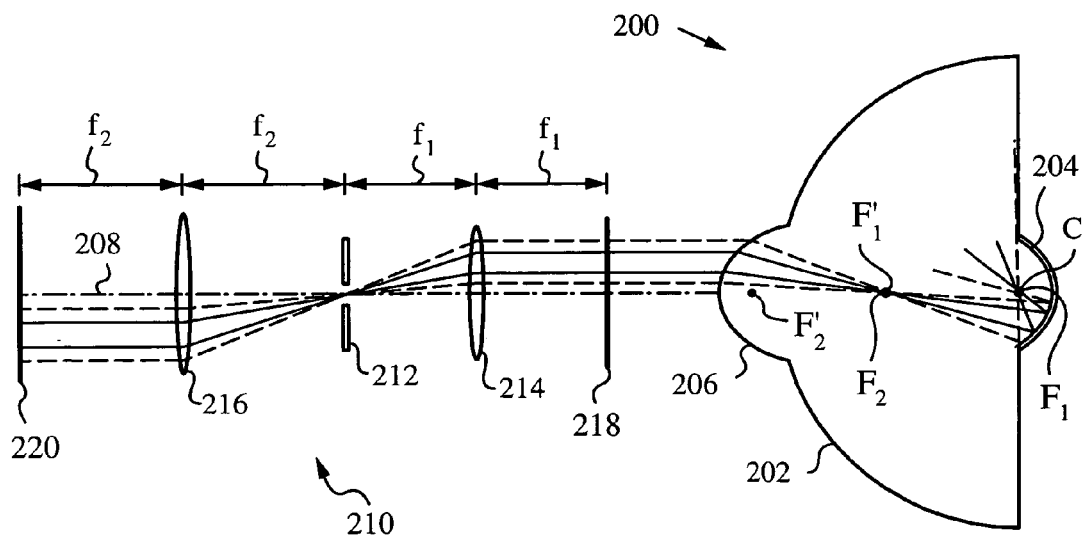
FIG. 11 is a cross-sectional side view of the lens similar to the one shown in FIG. 2 with an optical relay.

FIG. 11 is a cross-sectional side view of a lens 200 similar to lens 30 shown in FIG. 2 and equipped with an optical relay 210. Lens 200 has a spherical refractive surface 202, a facing ellipsoidal reflective surface 204 and a refractive ellipsoidal shaping surface 206. First focus $F_1$ of surface 204 and center C of surface 202 are coincident at the single viewpoint. Foci $F_1'$ and $F_2$ are also coincident. All foci are on optical axis 208.

Lens 200 differs from lens 30 in that it has no fixed aperture within its body. Rather, an adjustable aperture 212 is provided in optical relay 210 between lenses 214, 216. Lenses 214 and 216 have focal lengths $f_1$ and $f_2$ respectively. Relay 210 has a first image plane 218 at a distance equal to $f_1$ from lens 214. A second image plane 220 is located at a distance equal to $f_2$ from lens 216. A person skilled in the art will realize that relay 210 is a type of 4-f relay.

During operation aperture 212 can be adjusted to regulate the F-number of lens 200 and operate in a wide range of illumination conditions. It should be noted that opening aperture 212 to obtain a low F-number results in progressive deterioration of the single viewpoint property of lens 200.

The single viewpoint catadioptric lens according to the invention admits of myriads of other embodiments. For example, it does not have to be a solid lens, but can also be hollow, e.g., in cases where it is made by molding. In some cases where certain regions of the lens are hollow cavities left by the fabrication method, these hollow cavities can be filled with an optical fluid or gel having an index of refraction matching that of the solid sections of the lens. In still other embodiments the ellipsoidal reflective surface and/or the shaping surface are counter-sunk within the lens rather than being on an external profile. Given all the alternative embodiments, the scope of the invention is to be judged by the following claims and their legal equivalents.

What is claimed is:

1. A solid catadioptric lens having a single viewpoint on an optical axis and comprising:
  a) a spherical refractive surface having a center C on said optical axis;
  b) an ellipsoidal reflective surface facing said spherical refractive surface and having a first focus $F_1$ coincident with said center C, whereby said center C is said single viewpoint; and
  c) a shaping surface facing said ellipsoidal reflective surface for shaping a light passing said single viewpoint.

2. The solid catadioptric lens of claim 1, wherein said shaping surface is a refractive shaping surface and said solid catadioptric lens further comprises an aperture for enforcing said single viewpoint.

3. The solid catadioptric lens of claim 2, wherein said aperture is positioned at a second focus $F_2$ of said ellipsoidal reflective surface.

4. The solid catadioptric lens of claim 3, wherein said second focus $F_2$ is on said optical axis and substantially at said refractive shaping surface.

5. The solid catadioptric lens of claim 3, wherein said second focus $F_2$ is on said optical axis and inside said solid catadioptric lens.

6. The solid catadioptric lens of claim 2, wherein said refractive shaping surface is an ellipsoidal refractive shaping surface.

7. The solid catadioptric lens of claim 6, wherein said ellipsoidal refractive shaping surface has a first focus $F_1'$ coincident with said second focus $F_2$.

8. The solid catadioptric lens of claim 7, wherein said ellipsoidal refractive shaping surface has a conic constant $K_2$ equal to a conic constant $K_1$ of said ellipsoidal reflective surface.

9. The solid catadioptric lens of claim 1, wherein said shaping surface is a reflective shaping surface and said solid catadioptric lens further comprises an aperture for enforcing said single viewpoint.

10. The solid catadioptric lens of claim 9, wherein said aperture is positioned at said ellipsoidal reflective surface.

11. The solid catadioptric lens of claim 9, wherein said aperture is positioned beyond said ellipsoidal reflective surface.

12. The solid catadioptric lens of claim 9, wherein said reflective shaping surface is a second ellipsoidal reflective shaping surface.

13. The solid catadioptric lens of claim 12, wherein said second ellipsoidal reflective shaping surface has a first focus $F_1'$ coincident with said second focus $F_2$.

14. The solid catadioptric lens of claim 12, wherein said second ellipsoidal reflective shaping surface has a conic constant $K_2$ equal to a conic constant $K_1$ of said ellipsoidal reflective surface.

15. The solid catadioptric lens of claim 1 comprising an optical material having an index n.

16. The solid catadioptric lens of claim 1, wherein said shaping surface is a semi-transparent shaping surface.

17. The solid catadioptric lens of claim 1, wherein said shaping surface is selected from the group consisting of a flat shaping surface, an ellipsoidal shaping surface and a paraboloid shaping surface.

18. A single viewpoint vision system comprising:
  a) a solid catadioptric lens having an optical axis;
  b) a spherical refractive surface having a center C on said optical axis;
  c) an ellipsoidal reflective surface facing said spherical refractive surface and having a first focus $F_1$ coincident with said center C, whereby said center C is said single viewpoint; and
  d) a shaping surface facing said ellipsoidal reflective surface for shaping a light passing said single viewpoint.

19. The single viewpoint vision system of claim 18, further comprising an optical relay for passing said light.

20. The single viewpoint vision system of claim 18, wherein said shaping surface is selected from the group consisting of reflective shaping surface, refractive shaping surface and semi-transparent shaping surface.

21. The single viewpoint vision system of claim 18, wherein said shaping surface is selected from the group consisting of a flat shaping surface, an ellipsoidal shaping surface and a paraboloid shaping surface.

22. The single viewpoint vision system of claim 18, further comprising an element selected from the group consisting of scanning arrangement, imaging element and a display unit.

* * * * *